United States Patent
Kim et al.

(10) Patent No.: US 8,228,456 B2
(45) Date of Patent: Jul. 24, 2012

(54) LIQUID CRYSTAL DISPLAY AND DRIVING METHOD THEREOF

(75) Inventors: Sung-Woon Kim, Suwon-si (KR); Hee-Seop Kim, Hwaseong-si (KR); Hyang-Yul Kim, Hwaseong-si (KR); Joo-Nyung Jang, Gyeongsan-si (KR); Hwa-Sung Woo, Suwon-si (KR); Cheol Shin, Hwaseong-si (KR); Dong-Chul Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 374 days.

(21) Appl. No.: 12/619,245

(22) Filed: Nov. 16, 2009

(65) Prior Publication Data

US 2010/0225839 A1 Sep. 9, 2010

(30) Foreign Application Priority Data

Mar. 5, 2009 (KR) .................. 10-2009-0019016

(51) Int. Cl.
*G02F 1/136* (2006.01)

(52) U.S. Cl. ............. 349/48; 349/38; 349/141; 349/144
(58) Field of Classification Search .................. 349/48
See application file for complete search history.

(56) References Cited

U.S. PATENT DOCUMENTS

| 7,486,363 B2 * | 2/2009 | Mori et al. ............. 349/141 |
| 7,898,629 B2 * | 3/2011 | Ono et al. ............. 349/141 |
| 2006/0103800 A1 * | 5/2006 | Li et al. ............. 349/129 |

* cited by examiner

*Primary Examiner* — Richard Kim
(74) *Attorney, Agent, or Firm* — Cantor Colburn LLP

(57) ABSTRACT

A liquid crystal display includes; a first substrate, a gate line disposed on the first substrate, a first data line disposed substantially perpendicularly to the gate line on the first substrate, and which insulates and the gate line, a first thin film transistor connected to the gate line and the first data line, a first pixel electrode connected to the first thin film transistor, a liquid crystal capacitor including the first pixel electrode and a second pixel electrode as two terminals thereof, and a liquid crystal layer disposed between the first pixel electrode and the second pixel electrode, and a short transistor having a control terminal connected to a previous gate line, and which is controlled to short the first pixel electrode to a voltage approaching a voltage of the second pixel electrode.

13 Claims, 10 Drawing Sheets

US 8,228,456 B2

LIQUID CRYSTAL DISPLAY AND DRIVING METHOD THEREOF

This application claims priority to Korean Patent Application No. 10-2009-0019016, filed on Mar. 5, 2009, and all the benefits accruing therefrom under 35 U.S.C. §119, the content of which in its entirety is herein incorporated by reference.

BACKGROUND OF THE INVENTION (a) Field of the Invention

The present invention relates to a liquid crystal display and a driving method thereof.

(b) Description of the Related Art

A liquid crystal display ("LCD") is one of the most widely used types of flat panel displays ("FPD"), and it is typically composed of two display panels on which field generating electrodes such as pixel electrodes and a common electrode are formed, and a liquid crystal layer interposed between the two display panels. Voltages are applied to the field generating electrodes to generate an electric field within the liquid crystal layer, and the alignment of liquid crystal molecules of the liquid crystal layer is determined by the electric field. Accordingly, the polarization of incident light is controlled, thereby performing image display.

The LCD is typically driven through polarity inversion in which the polarity of the voltage applied to the liquid crystal layer is changed after each frame to prevent the degradation of the liquid crystal layer. The inversion driving may be applied in various ways such as by pixel unit, by pixel row unit, and by pixel column unit.

Also, the liquid crystal layer is arranged according to an electric field generated by an electrode applied with a predetermined voltage level and an electrode applied with a different voltage every frame. In such an LCD, the magnitude of the voltage applied to one electrode must be large, and to eliminate this problem, a driving method in which two electrodes are applied with different voltages per frame has been proposed.

In such a driving method, the voltages applied to two electrodes are changed every frame, however the charges may be irregularly accumulated within the two electrodes over a long operational time, and as a result, an electric field is generated between the two electrodes such that the liquid crystal layer is arranged in an arbitrary direction such that leakage light and afterimages may be generated.

BRIEF SUMMARY OF THE INVENTION

The present invention prevents the generation of an electric field due to charges that are irregularly accumulated to two electrodes.

To obtain this object, the present invention provides a predetermined potential to the electrode applying the electric field to the liquid crystal layer.

An exemplary embodiment of a liquid crystal display ("LCD") according to the present invention includes; a first substrate, a gate line disposed on the first substrate, a first data line disposed substantially perpendicularly to the gate line on the first substrate, and which insulates the gate line, a first thin film transistor connected to the gate line and the first data line, a first pixel electrode connected to the first thin film transistor, a liquid crystal capacitor including the first pixel electrode and a second pixel electrode as two terminals thereof, and a liquid crystal layer disposed between the first pixel electrode and the second pixel electrode, and a short transistor having a control terminal connected to a previous gate line, and which is controlled to short the first pixel electrode to a voltage approaching a voltage of the second pixel electrode. In one exemplary embodiment, an input terminal and an output terminal of the short transistor may be respectively connected to the first pixel electrode and the second pixel electrode.

One exemplary embodiment further includes a second data line disposed substantially parallel to the first data line, and a second thin film transistor including a control terminal connected to the gate line, an input terminal connected to the second data line, and an output terminal connected to the second pixel electrode.

In one exemplary embodiment, the first pixel electrode may include a plurality of first linear electrodes disposed substantially parallel to the data line, a first stem which connects the linear electrodes, a first extension which connects the first linear electrodes and the first stem to the first thin film transistor, and a first short portion which connects the first linear electrode and the first stem to the short transistor, and the second pixel electrode may include a plurality of second linear electrodes disposed substantially parallel to the data line, a second stem which connects the linear electrodes, a second extension which connects the second linear electrode and the second stem to the second thin film transistor, and a second short portion which connects the second linear electrode and the second stem to the short transistor.

In one exemplary embodiment, the liquid crystal display further includes; a first pixel including the first thin film transistor and the second thin film transistor, and a second pixel disposed adjacent to the first pixel and including; a third thin film transistor disposed substantially opposite to the first thin film transistor with respect to the second thin film transistor, and connected to the second data line, a fourth thin film transistor disposed adjacent to the third thin film transistor, and a second short transistor which is controlled to short the third pixel electrode.

In one exemplary embodiment, the timing with which the first thin film transistor and the second thin film transistor of the first pixel are turned on may be different from a timing with which the third thin film transistor and the fourth thin film transistor of the second pixel are turned on, and the first thin film transistor and the second thin film transistor of the first pixel may be turned on when the second short transistor of the other of the second pixel is turned on, and the third thin film transistor and the fourth thin film transistor of the second pixel are turned on when the short transistor of the first pixel is turned on.

In one exemplary embodiment, a swing signal line which swings between two voltage levels with a period of one frame may be further included, and the second pixel electrode may be connected to the swing signal line.

In one exemplary embodiment, the two voltage levels may be about 0V and a voltage level of an Avdd voltage.

In one exemplary embodiment, a voltage signal line applied with a constant voltage may be further included, and the second pixel electrode may be connected to the voltage signal line.

In one exemplary embodiment, an input terminal and an output terminal of the short transistor may be connected to the first pixel electrode and a voltage signal line may be applied with a constant voltage.

In one exemplary embodiment, a storage capacitor which includes the first pixel electrode and the voltage signal line as two terminals thereof may be further included.

In one exemplary embodiment, a swing signal line which swings between two voltage levels with a period of one frame may be further included, and the second pixel electrode may be connected to the swing signal line.

In one exemplary embodiment, a second thin film transistor including a control terminal connected to the gate line, and an input terminal and output terminal respectively connected to the swing signal line and the second pixel electrode, may be further included.

An exemplary embodiment of a method for driving an LCD including a gate line, a data line, a first pixel electrode, a second pixel electrode, and a short transistor according to the present invention includes; applying a gate-on voltage to the gate line, applying a data voltage to the data line, applying and maintaining a voltage to at least one of the first pixel electrode and the second pixel electrode, and turning on the short transistor to short the first pixel electrode.

In one exemplary embodiment, the turning on of the short transistor to short the first pixel electrode includes; turning on the short transistor according to a gate-on signal of a previous gate line, and shorting the first pixel electrode and the second pixel electrode.

In one exemplary embodiment, the applying of the data voltage to the data line includes applying a first data voltage to the first data line, and applying a second data voltage having substantially the opposite polarity of that of the first data voltage to the second data line, wherein the first pixel electrode may be applied with the first data voltage and the second pixel electrode may be applied with the second data voltage.

In one exemplary embodiment, the method may further include applying a voltage which swings between two voltage levels with a period of one frame to the second pixel electrode.

In one exemplary embodiment, the voltage in the applying and maintaining of the voltage to at least one of the first pixel electrode and the second pixel electrode may be maintained by a storage capacitor generated by overlapping at least one of the first pixel electrode and the second pixel electrode, and a voltage signal line which is applied with a constant voltage.

In one exemplary embodiment, the turning on of the short transistor to short the first pixel electrode may include; turning on the short transistor according to a gate-on signal of a previous gate line, and shorting the first pixel electrode to the voltage signal line.

In one exemplary embodiment, the method may further include applying a voltage which swings between two voltage levels with a period of one frame to the second pixel electrode.

As above-described, the electrode applying the electric field to a liquid crystal layer has a predetermined potential every predetermined interval such that unwanted charges are not accumulated to the electrode, and as a result the liquid crystal layer may be prevented from being aligned by the unwanted electric field. Therefore, the light incident from a backlight does not leak, and afterimages are prevented. Also, the electrode has a temporary predetermined potential such that the liquid crystal layer is not aligned by the predetermined potential such that a loss of transmittance is not generated. Further, when the voltage applied to the electrode is temporarily changed under the inversion driving, the magnitude of the voltage is reduced such that the swing width of the voltage due to the inversion driving may be reduced.

DETAILED DESCRIPTION OF THE INVENTION

Figure 1:
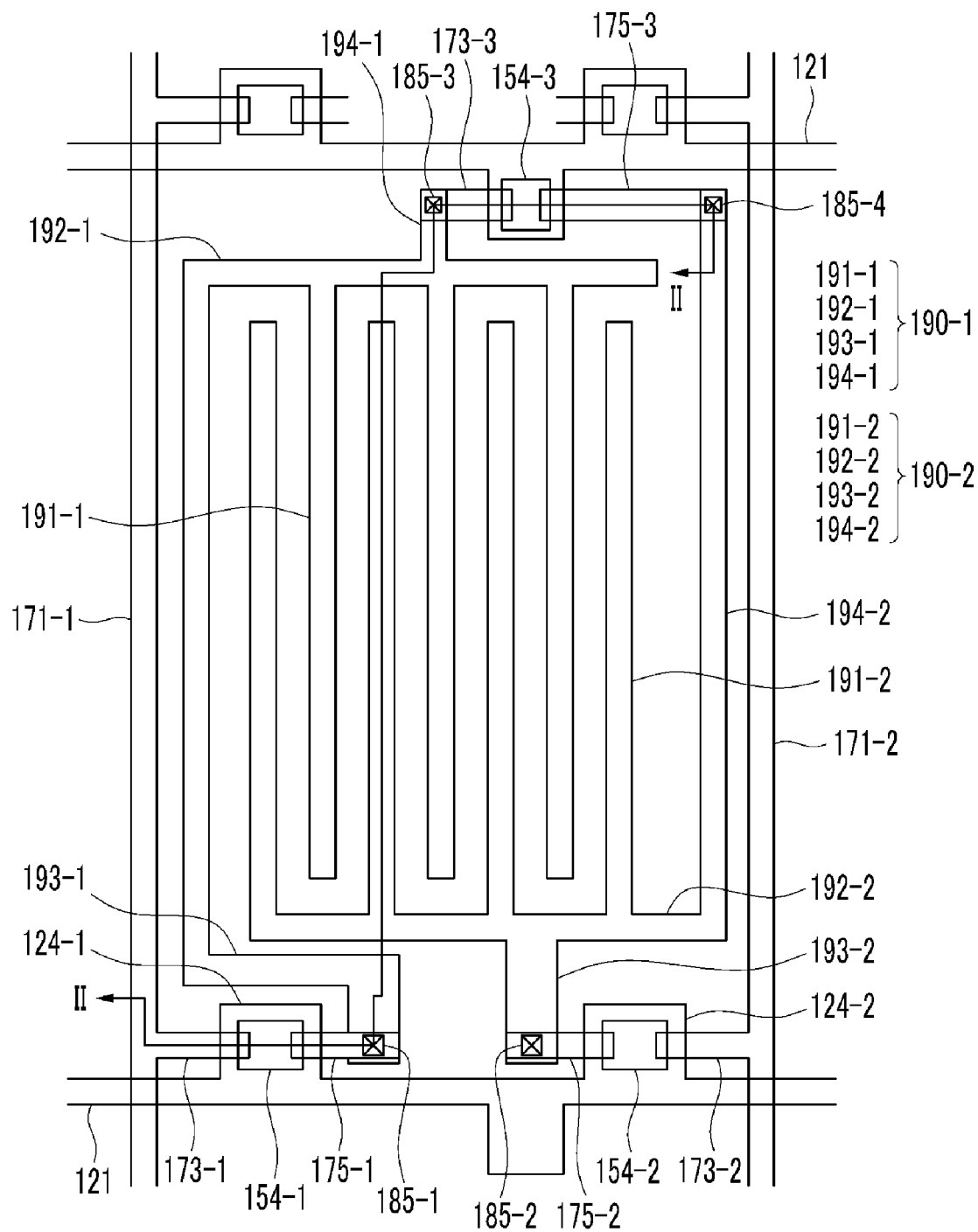
FIG. 1 is a top plan layout view of one pixel in an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being on another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Firstly, an exemplary embodiment of a liquid crystal display ("LCD") according to the present invention will be described with reference to FIG. 1 and FIG. 2.

Figure 2:
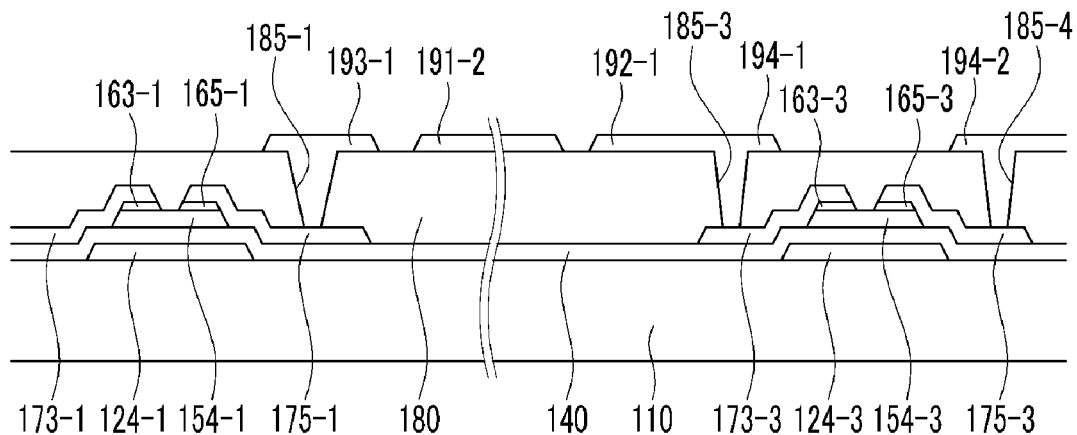
FIG. 2 is a cross-sectional view of the exemplary embodiment of an LCD shown in FIG. 1 taken along line II-II.

FIG. 1 is a layout view of one pixel in an exemplary embodiment of an LCD according to the present invention, and FIG. 2 is a cross-sectional view of the exemplary embodiment of an LCD shown in FIG. 1 taken along line II-II.

Referring to FIG. 1 and FIG. 2, one pixel of an exemplary embodiment of an LCD according to the present invention includes two data lines 171-1 and 171-2, three TFTs, and two pixel electrodes 190-1 and 190-2.

Next, the detailed structure of the exemplary embodiment of an LCD according to the present invention will be described with reference to FIG. 1 and FIG. 2.

A plurality of gate lines 121 are formed on an insulation substrate 110, exemplary embodiments of which may be made of transparent glass, plastic or other similar materials.

The gate lines 121 transmit gate signals and extend in a substantially transverse direction. Each gate line 121 includes a plurality of gate electrodes 124-1 and 124-2 protruding upward therefrom, and a plurality of gate electrodes 124-3 protruding downward therefrom. One pixel includes three gate electrodes 124-1, 124-2, and 124-3, and hereafter, with reference to FIG. 1, the left gate electrode is referred to as the first gate electrode 124-1, the right gate electrode is referred to as the second gate electrode 124-2, and the upper gate electrode which extends downward from the previous gate line is referred to as the third gate electrode 124-3.

A gate insulating layer 140, exemplary embodiments of which may be made of silicon nitride ("SiNx"), silicon oxide ("SiOx") or other similar materials is formed on the gate lines 121.

A plurality of semiconductor islands 154-1, 154-2, and 154-3, exemplary embodiments of which may be made of hydrogenated amorphous silicon (a-Si), polysilicon, or other similar materials, are formed on the gate insulating layer 140. Three semiconductor islands are formed per pixel and they roughly correspond to the locations of the three gate electrodes 124-1, 124-2 and 124-3, and hereafter, with reference to FIG. 1, the left semiconductor island is referred to as the first semiconductor 154-1, the right semiconductor island is referred to as the second semiconductor 154-2, and the upper semiconductor island is referred to as the third semiconductor 154-3. As discussed above, the first semiconductor 154-1 is disposed on the first gate electrode 124-1, the second semiconductor 154-2 is disposed on the second gate electrode 124-2, and the third semiconductor 154-3 is disposed on the third gate electrode 124-3.

A plurality of ohmic contact islands 163-1, 163-2, 163-3, 165-1, 165-2, and 165-3 are formed on semiconductor islands 154-1, 154-2, and 154-3. Exemplary embodiments of the ohmic contacts may be made of a material such as n+ hydrogenated amorphous silicon in which an n-type impurity such as phosphor is doped with a high density, or they may be made of silicide or other substance having similar characteristics. The ohmic contacts are disposed as pairs on the semiconductor islands 154-1, 154-2, and 154-3.

A plurality of data lines 171-1 and 171-2, a plurality of drain electrodes 175-1 and 175-2, and a plurality of connection electrodes 173-3 and 175-3 are formed on the ohmic contacts 163-1, 163-2, 163-3, 165-1, 165-2, and 165-3, and the gate insulating layer 140 as shown in FIG. 2. Two data lines 171-1 and 171-2, and two drain electrodes 175-1 and 175-2 are disposed for each pixel, and hereafter, with reference to FIG. 1, the left data line and the left drain electrode are respectively referred to as the first data line 171-1 and the first drain electrode 175-1, the right data line and the right drain electrode are respectively referred to as the second data line 171-2 and the second drain electrode 175-2, and the upper data line and the upper drain electrode are respectively referred to as the first connection electrode 173-3 and the second connection electrode 175-3.

The data lines 171-1 and 171-2 transmit data signals having different polarities from each other, and extend in the longitudinal direction thereby being substantially perpendicular to the gate lines 121. Each of the data lines 171-1 and 171-2 includes a plurality of source electrodes 173-1 and 173-2 respectively extending toward the gate electrodes 124-1 and 124-2. Two source electrodes 173-1 and 173-2 are also disposed for each pixel, and with reference to FIG. 1, the left source electrode is referred to as the first source electrode 173-1, and the right source electrode is referred to as the second source electrode 173-2.

The drain electrodes 175-1 and 175-2 are separated from the data lines 171-1 and 171-2, and are disposed opposite to the source electrodes 173-1 and 173-2 with respect to the gate electrodes 124-1 and 124-2, respectively.

The gate electrodes 124-1 and 124-2, the source electrodes 173-1 and 173-2, and the drain electrodes 175-1 and 175-2, along with the semiconductors 154-1 and 154-2 respectively form thin film transistors TFT1 and TFT2, and the channels of the thin film transistors are respectively formed in the semiconductors 154-1 and 154-2 between the source electrodes 173-1 and 173-2 and the drain electrodes 175-1 and 175-2. As described above, one pixel includes two thin film transistors TFT1 and TFT2, and with reference to FIG. 1, the left thin film transistor is referred to as the first thin film transistor TFT1, and the right thin film transistor is referred to as the second thin film transistor TFT2. On the other hand, the third gate electrode 124-3, the first connection electrode 173-3, and the second connection electrode 175-3 along with the third semiconductor 154-3 form a thin film transistor, and it is referred to as a short transistor STFT.

A passivation layer 180 is formed on the data lines 171-1 and 171-2, the drain electrodes 175-1 and 175-2, the connection electrodes 173-3 and 175-3, and the exposed semiconductors 154-1 and 154-2. Exemplary embodiments of the passivation layer 180 may be made of an inorganic insulator or an organic insulator, and may have a planarized surface. An exemplary embodiment of the inorganic insulator may be silicon nitride or silicon oxide or other similar materials. The organic insulator may have photosensitivity, and in certain exemplary embodiments the dielectric constant thereof is less than about 4.0. Also, exemplary embodiments include configurations wherein the passivation layer 180 may have a dual-layered structure including a lower inorganic layer and an upper organic layer so as to not cause damage to the exposed portions of the semiconductors 154 while maintaining the excellent insulating characteristics of the organic layer.

The passivation layer 180 has a plurality of contact holes respectively exposing the drain electrodes 175-1 and 175-2 and the connection electrodes 173-3 and 175-3. The contact hole exposing the first drain electrode 175-1 is referred to as the first contact hole 185-1, the contact hole exposing the second drain electrode 175-2 is referred to as the second contact hole 185-2, and the contact holes respectively exposing the connection electrodes 173-3 and 175-3 are respectively referred to as the third contact hole 185-3 and the fourth contact hole 185-4.

A plurality of pixel electrodes 190-1 and 190-2 are formed on the passivation layer 180. Exemplary embodiments of the pixel electrodes 190-1 and 190-2 are formed of a transparent conductive material, exemplary embodiments of which include indium tin oxide ("ITO"), indium zinc oxide ("IZO") or other materials having similar characteristics, and two pixel electrodes 190-1 are 190-2 are disposed within each pixel.

The first pixel electrode 190-1 is physically and electrically connected to the first drain electrode 175-1 through the first contact hole 185-1, and receives the first data voltage from the first drain electrode 175. The first pixel electrode 190-1 includes a plurality of first linear electrodes 191-1 that are substantially parallel to the data lines 171-1, a first stem 192-1 connecting the first linear electrodes 191-1 to each other and being substantially perpendicular to the first linear electrodes 191-1, a first extension 193-1 extending from the first linear electrode 191-1 and the first stem 192-1 to be connected to the first drain electrode 175-1, and a first short portion 194-1 connected to the short transistor SIFT through the first connection electrode 173-3.

Similarly, the second pixel electrode 191-2 is physically and electrically connected to the second drain electrode 175-2 through the second contact hole 185-2, and receives the second data voltage from the second drain electrode 175-2. The second pixel electrode 190-2 includes a plurality of second linear electrodes 191-2 that are substantially parallel to the data lines 171-1, a second stem 192-2 connecting the second linear electrodes 191-2 to each other and being substantially perpendicular to the second linear electrodes 191-2, a second extension 193-2 extending from the second linear electrode 191-2 and the second stem 192-2 to be connected to the second drain electrode 175-2, and a second short portion 194-2 connected to the short transistor STFT through the second connection electrode 175-3.

In the present exemplary embodiment, the first linear electrode 191-1 and the second linear electrode 191-2 are alternately formed with a predetermined distance therebetween, and are substantially parallel to each other. Such an arrangement may be referred to as an interdigitated tooth or comb-type arrangement.

According to one exemplary embodiment the upper substrate (not shown) may be formed with a color filter and a black matrix, and may be formed with an opposed electrode covering substantially the entire upper substrate.

A liquid crystal layer is disposed between the upper substrate and the lower insulation substrate 110. In one exemplary embodiment, the liquid crystal layer may be aligned substantially perpendicularly to the substrate when the voltage is not applied to the pixel electrodes 190-1 and 190-2. An orientation of liquid crystal molecules in the liquid crystal layer is arranged by the electric field generated between the pixel electrodes 190-1 and 190-2.

Figure 3:
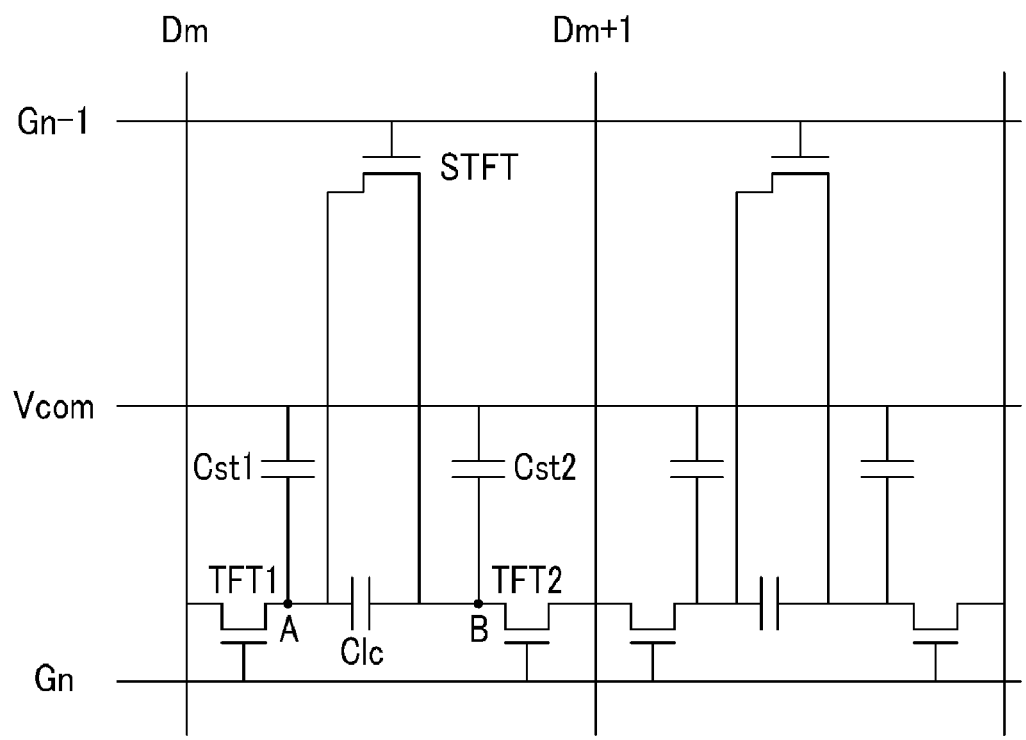
FIG. 3 is an equivalent circuit diagram of the exemplary embodiment of a pixel according to the exemplary embodiment of the LCD of FIG. 1 and FIG. 2.
Figure 4:
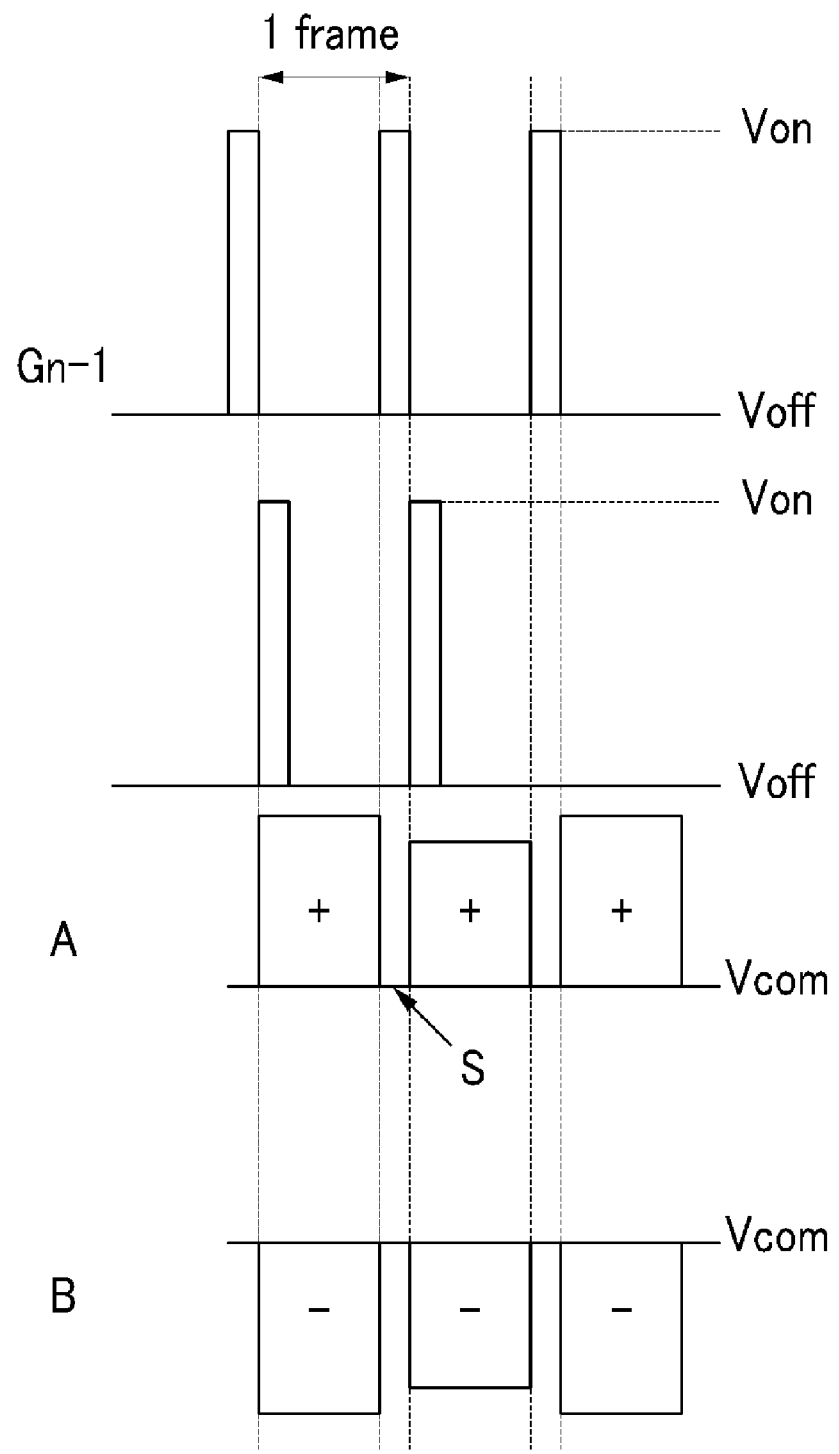
FIG. 4 is a graph showing a voltage according to a signal application in the exemplary embodiment of an LCD of FIG. 1 and FIG. 2.

FIG. 3 is an equivalent circuit diagram of the exemplary embodiment of a pixel according to an exemplary embodiment of the LCD of FIG. 1 and FIG. 2, and FIG. 4 is a graph showing a voltage according to a signal application in the exemplary embodiment of an LCD of FIG. 1 and FIG. 2.

FIG. 3 is an equivalent circuit diagram of the exemplary embodiment of a pixel according to an exemplary embodiment of the LCD of FIG. 1 and FIG. 2.

Here, Gn and Gn−1 indicate the gate lines, where Gn is the n-th gate line and Gn−1 indicates the (n−1)-th gate line. Dm and Dm+1 indicate the data lines, where Dm is the m-th data line and Dm+1 is the (m+1)-th data line. TFT1 indicates the first thin film transistor, TFT2 indicates the second thin film transistor, and STFT indicates the short transistor.

Also, Clc indicates a liquid crystal capacitor including the pixel electrodes 190-1 and 190-2 and the liquid crystal layer controlled by the electric field generated therebetween, and Cst1 and Cst2 respectively indicate a first storage capacitor and a second storage capacitor. A Vcom line is not shown in FIG. 1 and FIG. 2, however the Vcom wiring is shown as FIG. 3, and the Vcom wiring is applied with a predetermined voltage such as a Vcom voltage, in the present exemplary embodiment it is substantially parallel to the gate lines Gn and Gn−1, and it overlaps a portion of the pixel electrodes 190-1 and 190-2. The first storage capacitor Cst1 is formed by overlapping the first pixel electrode 190-1 and the Vcom wiring with each other, e.g., they are vertically aligned with one another as seen from a cross-sectional view, and the second storage capacitor Cst2 is formed by overlapping the second pixel electrode 190-2 and the Vcom wiring with each other, e.g., they are vertically aligned with one another as seen from a cross-sectional view.

In one exemplary embodiment, the above-described structure is driven by the driving signals as shown in FIG. 4.

Firstly, if the gate lines Gn and Gn−1 are sequentially applied with the gate-on signal and after all of the gate lines are applied with the gate-on signal, 1 frame is passed. The data lines Dm and Dm+1 are applied with data voltages having different polarities, and two voltages applied to the data lines Dm and Dm+1 may have substantially the same magnitude according to the present exemplary embodiment. The polarity of the data voltage may be changed over a predetermined period. The data voltage applied through the data line Dm is passed through the first thin film transistor TFT1 and is transmitted to a position A, as shown in FIG. 3, when the first thin film transistor TFT1 is turned on. Also, the data voltage applied to the data line Dm+1 is passed through the second thin film transistor TFT2 and is transmitted to a position B, as shown in FIG. 3, when the second thin film transistor TFT2 is turned on. The data voltages applied to the positions A and B form the voltages of both terminals of the liquid crystal capacitor Clc, thereby generating the electric field, and as a result the liquid crystal layer is aligned thereby changing the transmittance of light. The data voltages applied to the positions A and B are respectively maintained during one frame by the first storage capacitor Cst1 and the second storage capacitor Cst2.

If the gate line Gn−1 is applied with the gate-on signal at the next frame, the short transistor STFT is turned on such that the voltages of both terminals of the liquid crystal capacitor Clc are shorted to one another, e.g., their voltages are allowed to equalize across the short transistor STFT, and as a result, the voltage levels of the positions A and B become the same. This is indicated by S in FIG. 4, and is referred to as a shorting interval S hereafter. As a result, both terminals of the liquid crystal capacitor Clc (i.e., the first pixel electrode 190-1 and the second pixel electrode 190-2) do not accumulate unwanted charges.

The shorting interval S of FIG. 4 is continued during the interval in which the previous gate line Gn−1 is applied with the gate-on voltage, in the present exemplary embodiment the time that the gate-on voltage is applied is several μs, and it is possible for the charges to be moved during this time, however it is difficult for the liquid crystal layer to quickly react to the change in voltages and be rearranged thereby. As a result, the arrangement of the liquid crystal layer is not changed during the shorting interval S such that the change of the luminance is not generated and the change of the transmittance does not occur.

In the exemplary embodiment of FIG. 1 and FIG. 2, the connection electrodes 173-3 and 175-3 are additionally formed to form the short transistor STFT. However, exemplary embodiments also include configurations wherein the short transistor STFT may be formed without the connection electrodes 173-3 and 175-3. For example, in the exemplary embodiment of FIG. 1 and FIG. 2, the gate line is formed under the data line, however the data line may be disposed below the gate line, and thereby the additional connection electrode may not be necessary.

Figure 5:
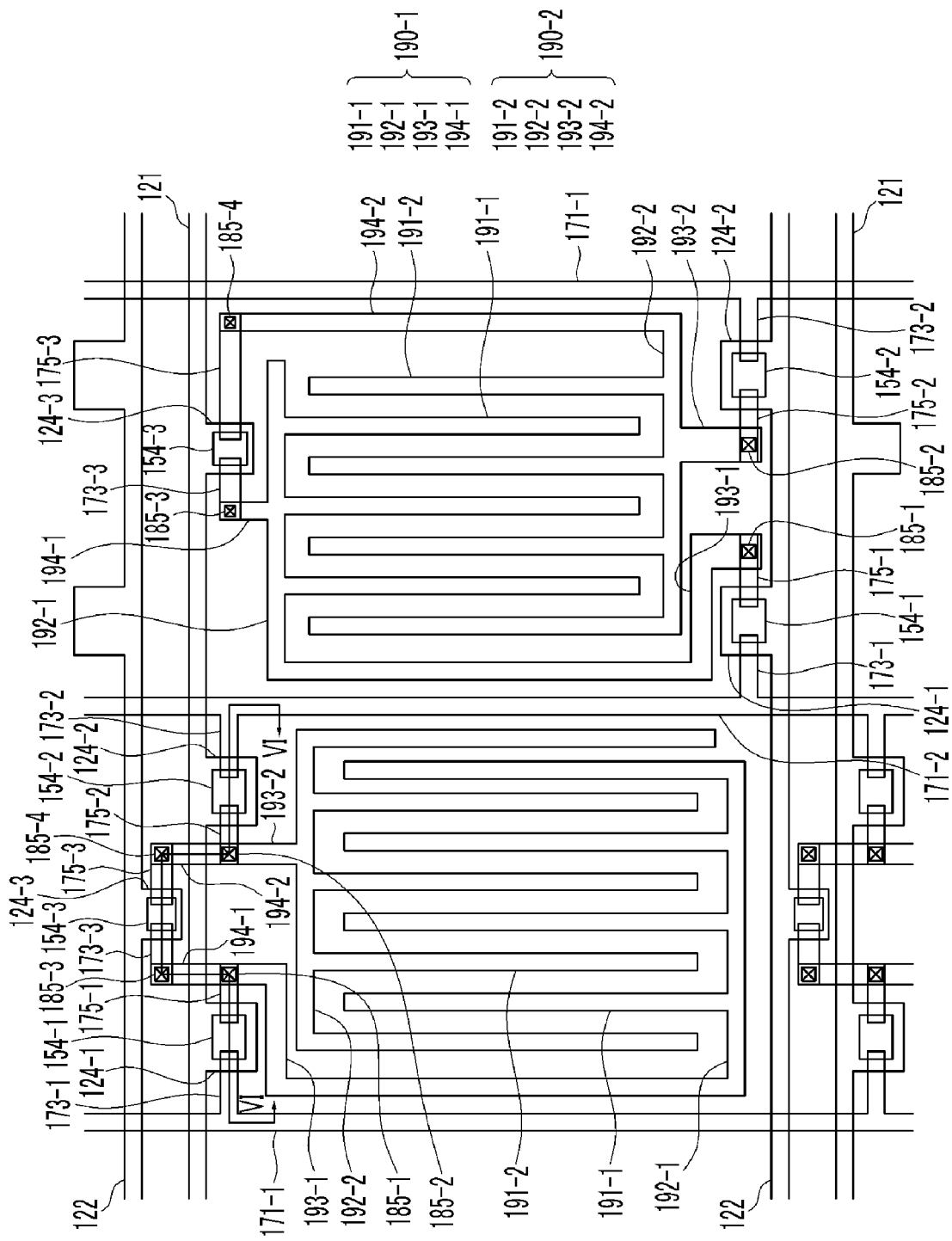
FIG. 5 is a top plan layout view of one pixel in another exemplary embodiment of an LCD according to the present invention.

Next, another exemplary embodiment of the present invention will be described with reference to FIG. 5 to FIG. 7. FIG. 5 is a top plan layout view of another exemplary embodiment of one pixel in another exemplary embodiment of an LCD according to the present invention, FIG. 6 is a cross-sectional view of the exemplary embodiment of an LCD shown in FIG. 5 taken along line VI-VI, and FIG. 7 is an equivalent circuit diagram of the exemplary embodiment of a pixel according to the exemplary embodiment of an LCD of FIG. 5 and FIG. 6.

Firstly, the structure of the current exemplary embodiment of a pixel according to the present invention will be described with reference to FIG. 5 and FIG. 6.

Figure 6:
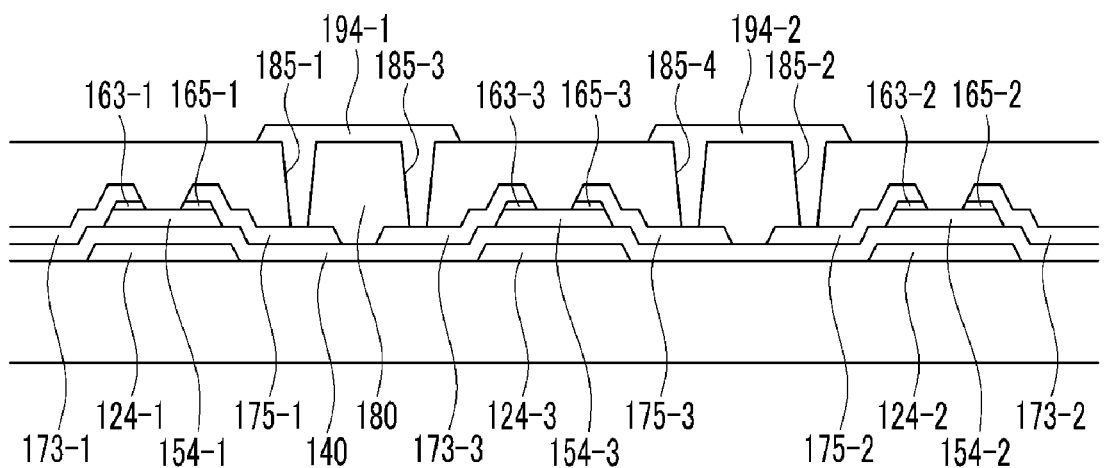
FIG. 6 is a cross-sectional view of the exemplary embodiment of an LCD shown in FIG. 5 taken along line VI-VI.
Figure 7:
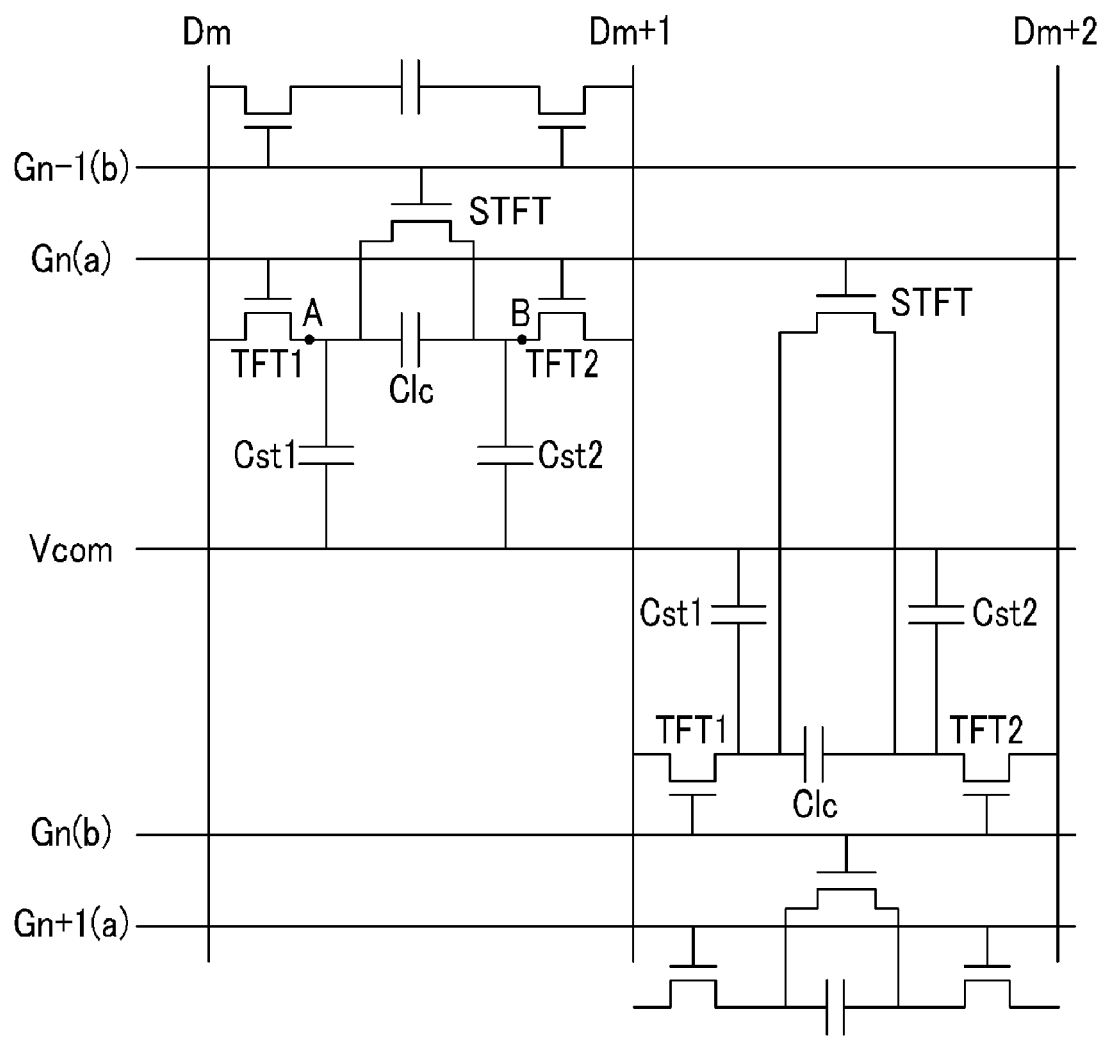
FIG. 7 is an equivalent circuit diagram of the exemplary embodiment of a pixel according to the exemplary embodiment of the LCD of FIG. 5 and FIG. 6.

Referring to FIG. 5 and FIG. 6, one pixel of an exemplary embodiment of an LCD according to the present invention includes two data lines 171-1 and 171-2, two gate lines 121 and 122, three TFTs, and two pixel electrodes 190-1 and 190-2. Also, two neighboring pixels share one data line 171-2.

Firstly, the left pixel of two neighboring pixels will be described with reference to FIG. 5 and FIG. 6.

A plurality of first gate lines 121 and a plurality of second gate lines 122 are formed on an insulation substrate 110, exemplary embodiments of which may be made of transparent glass, plastic or other similar materials.

The gate lines 121 and 122 transmit gate signals and extend substantially in the transverse direction. The first gate line 121 includes a plurality of gate electrodes 124-1 and 124-2 protruding downward therefrom. The second gate line 122 includes a plurality of gate electrodes 124-3 protruding downward therefrom. That is, one pixel includes three gate electrodes 124-1, 124-2, and 124-3, and hereafter, with reference to the left pixel of FIG. 5, the left gate electrode is referred to as the first gate electrode 124-1, the right gate electrode is referred to as the second gate electrode 124-2, and the upper gate electrode extended downward from the second gate line 122 is referred to as the third gate electrode 124-3.

A gate insulating layer 140, exemplary embodiments of which may be made of silicon nitride (SiNx) or silicon oxide (SiOx) or other similar materials, is formed on the gate lines 121 and 122.

A plurality of semiconductor islands 154-1, 154-2, and 154-3, exemplary embodiments of which may be made of hydrogenated amorphous silicon (a-Si), polysilicon, or other similar materials, are formed on the gate insulating layer 140. Three semiconductor islands are formed per pixel, and hereafter, with reference to the left pixel of FIG. 5, the left semiconductor island is referred to as the first semiconductor 154-1, the right semiconductor island is referred to as the second semiconductor 154-2, and the upper semiconductor island is referred to as the third semiconductor 154-3. The first semiconductor 154-1 is disposed on the first gate electrode 124-1, the second semiconductor 154-2 is disposed on the second gate electrode 124-2, and the third semiconductor 154-3 is disposed on the third gate electrode 124-3.

A plurality of ohmic contact islands 163-1, 163-2, 163-3, 165-1, 165-2, and 165-3 are formed on semiconductor islands 154-1, 154-2, and 154-3. In the present exemplary embodiment, the ohmic contacts may be made of a material such as n+hydrogenated amorphous silicon in which an n-type impurity such as phosphor is doped with a high density, or they may be made of silicide, or other similar materials. The ohmic contacts are disposed as pairs on the semiconductor islands 154-1, 154-2, and 154-3 as shown in FIG. 6.

A plurality of source electrodes 173-1 and 173-2 extending from the data lines 171-1 and 171-2, respectively, a plurality of drain electrodes 175-1 and 175-2, and a plurality of connection electrodes 173-3 and 175-3 are formed on the ohmic contacts 163-1, 163-2, 163-3, 165-1, 165-2, and 165-3, and the gate insulating layer 140. Two data lines 171-1 and 171-2 and two drain electrodes 175-1 and 175-2 are disposed for each pixel, and hereafter, with reference to the left pixel of FIG. 5, the left data line and the left drain electrode are respectively referred to as the first data line 171-1 and the first drain electrode 175-1, the right data line and the right drain electrode are respectively referred to as the second data line 171-2 and the second drain electrode 175-2, and the upper data line and the upper drain electrode are respectively referred to as the first connection electrode 173-3 and the second connection electrode 175-3. Here, the second data line 171-2 is shared with neighboring pixels.

In the present exemplary embodiment, the data lines 171-1 and 171-2 transmit data signals having different polarities from each other, and extend substantially in the longitudinal direction thereby being substantially perpendicular to the gate lines 121. Each of the data lines 171-1 and 171-2 includes the plurality of source electrodes 173-1 and 173-2 respectively extending toward the gate electrodes 124-1 and 124-2. Two source electrodes 173-1 and 173-2 are also disposed within each pixel, and with reference to the left pixel of FIG. 1, the left source electrode is referred to as the first source electrode 173-1, and the right source electrode is referred to as the second source electrode 173-2.

The drain electrodes 175-1 and 175-2 are separated from the data lines 171-1 and 171-2, and are disposed substantially opposite to the source electrodes 173-1 and 173-2 with respect to the gate electrodes 124-1 and 124-2.

The gate electrodes 124-1 and 124-2, the source electrodes 173-1 and 173-2, and the drain electrodes 175-1 and 175-2 along with the semiconductors 154-1 and 154-2 respectively form thin film transistors TFT1 and TFT2, and the channels of the thin film transistors TFT1 and TFT2 are respectively formed in the semiconductors 154-1 and 154-2 between the source electrodes 173-1 and 173-2 and the drain electrodes 175-1 and 175-2. As described above, one pixel includes two thin film transistors TFT1 and TFT2, and with reference to the left pixel of FIG. 5, the left thin film transistor is referred to as the first thin film transistor TFT1, and the right thin film transistor is referred to as the second thin film transistor TFT2. The third gate electrode 124-3, the first connection electrode 173-3, and the second connection electrode 175-3 along with the third semiconductor 154-3, form a thin film transistor, and it is referred to as a short transistor STFT.

A passivation layer 180 is formed on the data lines 171-1 and 171-2, the drain electrodes 175-1 and 175-2, the connection electrodes 173-3 and 175-3, and the exposed semiconductors 154-1 and 154-2. Exemplary embodiments of the passivation layer 180 may be made of an inorganic insulator or an organic insulator, and may have a planarized surface. An exemplary embodiment of the inorganic insulator may include silicon nitride, silicon oxide or other similar materials. In one exemplary embodiment, the organic insulator may have photosensitivity, and the dielectric constant thereof may be less than about 4.0. Also, exemplary embodiments include configuration wherein the passivation layer 180 may have a dual-layered structure of a lower inorganic layer and an upper organic layer so as to not cause damage to the exposed portions of the semiconductors 154-1 and 154-2 while maintaining the excellent insulating characteristics of the organic layer.

The passivation layer 180 has a plurality of contact holes respectively exposing the drain electrodes 175-1 and 175-2 and the connection electrodes 173-3 and 175-3. The contact hole exposing the first drain electrode 175-1 is referred to as the first contact hole 185-1, the contact hole exposing the second drain electrode 175-2 is referred to as the second contact hole 185-2, and the contact holes respectively exposing the connection electrodes 173-3 and 175-3 are respectively referred to as the third contact hole 185-3 and the fourth contact hole 185-4.

A plurality of pixel electrodes 190-1 and 190-2 are formed on the passivation layer 180. Exemplary embodiments of the pixel electrodes 190-1 and 190-2 are formed of a transparent conductive material such as ITO or IZO, and two pixel electrodes 190-1 are 190-2 are disposed within each pixel.

The first pixel electrode 190-1 is physically and electrically connected to the first drain electrode 175-1 through the first contact hole 185-1, and receives the first data voltage from the first drain electrode 175. The first pixel electrode 190-1 includes a plurality of first linear electrodes 191-1 that are substantially parallel to the data lines 171 and 171-1, a first stem 192-1 connecting the first linear electrodes 191-1 to each other and being substantially perpendicular to the first linear electrode 191-1, a first extension 193-1 extending from the first linear electrode 191-1 and the first stem 192-1 to be connected to the first drain electrode 175-1, and a first short portion 194-1 to be connected to the short transistor STFT through the first connection electrode 173-3.

Similarly, the second pixel electrode 191-2 is physically and electrically connected to the second drain electrode 175-2 through the second contact hole 185-2, and receives the second data voltage from the second drain electrode 175-2. The second pixel electrode 190-2 includes a plurality of second linear electrodes 191-2 that are substantially parallel to the data lines 171 and 171-1, a second stem 192-2 connecting the second linear electrodes 191-2 to each other and being substantially perpendicular to the second linear electrode 191-2, a second extension 193-2 extended from the second linear electrode 191-2 and the second stem 192-2 to be connected to the second drain electrode 175-21, and a second short portion 194-2 extended to be connected to the short transistor STFT through the second connection electrode 175-3.

In the present exemplary embodiment, the first linear electrode 191-1 and the second linear electrode 191-2 are alternately formed with a predetermined distance therebetween, and are substantially parallel to each other. Such an arrangement may be referred to as an interdigitated tooth or comb-type arrangement.

The left pixel of FIG. 5 has been described above. Next, the right pixel of FIG. 5 will be described.

As described above, the plurality of first gate lines 121 and the plurality of second gate lines 122 are formed on the insulation substrate 110, exemplary embodiments of which may be made of transparent glass, plastic or other similar materials.

The gate lines 121 and 122 transmit gate signals and extend substantially in the transverse direction. The second gate line 122 includes the plurality of gate electrodes 124-1 and 124-2 protruding upward therefrom. The first gate line 121 includes the plurality of gate electrodes 124-3 protruding downward therefrom. That is, one pixel includes three gate electrodes 124-1, 124-2, and 124-3, and hereafter, with reference to the right pixel of FIG. 5, the left gate electrode is referred to as the first gate electrode 124-1, the right gate electrode is referred to as the second gate electrode 124-2, and the upper gate electrode extended downward from the first gate line 121 is referred to as the third gate electrode 124-3.

The gate insulating layer 140, exemplary embodiments of which may be made of silicon nitride (SiNx), silicon oxide (SiOx) or other similar materials, is formed on the gate lines 121 and 122.

A plurality of semiconductor islands 154-1, 154-2, and 154-3 that are made of hydrogenated amorphous silicon (a-Si), polysilicon, or other similar materials, are formed on the gate insulating layer 140. Three semiconductor islands are formed per pixel, and hereafter, with reference to the right pixel of FIG. 5, the left semiconductor island is referred to as the first semiconductor 154-1, the right semiconductor island is referred to as the second semiconductor 154-2, and the upper semiconductor island is referred to as the third semiconductor 154-3. The first semiconductor 154-1 is disposed on the first gate electrode 124-1, the second semiconductor 154-2 is disposed on the second gate electrode 124-2, and the third semiconductor 154-3 is disposed on the third gate electrode 124-3.

A plurality of ohmic contact islands 163-1, 163-2, 163-3, 165-1, 165-2, and 165-3 are formed on semiconductor islands 154-1, 154-2, and 154-3. Exemplary embodiments of the ohmic contacts may be made of a material such as n+ hydrogenated amorphous silicon in which an n-type impurity such as phosphor is doped with a high density, or may be made of silicide or other similar materials. The ohmic contacts are disposed as pairs on the semiconductor islands 154-1, 154-2, and 154-3.

A plurality of source electrodes 173-1 and 173-2 extending from the data lines 171-1 and 171-2, a plurality of drain electrodes 175-1 and 175-2, and a plurality of connection electrodes 173-3 and 175-3 are formed on the ohmic contacts 163-1, 163-2, 163-3, 165-1, 165-2, and 165-3, and the gate insulating layer 140. Two data lines 171-1 and 171-2 and two drain electrodes 175-1 and 175-2 are disposed for each pixel, and hereafter, with reference to the right pixel of FIG. 5, the left data line and the left drain electrode are respectively referred to as the second data line 171-2 and the first drain electrode 175-1, the right data line and the right drain electrode are respectively referred to as the first data line 171-1 and the second drain electrode 175-2, and the upper data line and the upper drain electrode are respectively referred to as the first connection electrode 173-3 and the second connection electrode 175-3. Here, the second data line 171-2 is shared with neighboring pixels.

The data lines 171-1 and 171-2 transmit data signals having different polarities from each other, and extend substantially in the longitudinal direction thereby being substantially perpendicular to the gate lines 121. Each of the data lines 171-1 and 171-2 includes a plurality of source electrodes 173-1 and 173-2 respectively extending toward the gate electrodes 124-1 and 124-2. Two source electrodes 173-1 and 173-2 are also disposed within each pixel, and with reference to the right pixel of FIG. 1, the left source electrode is referred to as the first source electrode 173-1, and the right source electrode is referred to as the second source electrode 173-2.

The drain electrodes 175-1 and 175-2 are separated from the data lines 171-1 and 171-2, and are disposed substantially opposite to the source electrodes 173-1 and 173-2 with respect to the gate electrodes 124-1 and 124-2.

The gate electrodes 124-1 and 124-2, the source electrodes 173-1 and 173-2, and the drain electrodes 175-1 and 175-2 along with the semiconductors 154-1 and 154-2 respectively form thin film transistors TFT1 and TFT2, and the channels of the thin film transistors are respectively formed in the semiconductors 154-1 and 154-2 between the source electrodes 173-1 and 173-2 and the drain electrodes 175-1 and 175-2. As described above, one pixel includes two thin film transistors TFT1 and TFT2, and with reference to the right pixel of FIG. 5, the left thin film transistor is referred to as the first thin film transistor TFT1, and the right thin film transistor is referred to as the second thin film transistor TFT2. On the other hand, the third gate electrode 124-3, the first connection electrode 173-3, and the second connection electrode 175-3 along with the third semiconductor 154-3 form a thin film transistor, and it is referred to as a short transistor STFT.

A passivation layer 180 is formed on the data lines 171-1 and 171-2, the drain electrodes 175-1 and 175-2, the connection electrodes 173-3 and 175-3, and the exposed semiconductors 154-1 and 154-2. Exemplary embodiments of the passivation layer 180 may be made of an inorganic insulator or an organic insulator, and may have a planarized surface. An exemplary embodiment of the inorganic insulator may be silicon nitride or silicon oxide or other similar substances. Exemplary embodiments of the organic insulator may have photosensitivity, and in one exemplary embodiment the dielectric constant thereof may be less than about 4.0. Also, exemplary embodiments include configurations wherein the passivation layer 180 may have a dual-layered structure of a lower inorganic layer and an upper organic layer so as to not cause damage to the exposed portions of the semiconductors 154-1 and 154-2 while maintaining the excellent insulating characteristics of the organic layer.

The passivation layer 180 has a plurality of contact holes respectively exposing the drain electrodes 175-1 and 175-2 and the connection electrodes 173-3 and 175-3. The contact hole exposing the first drain electrode 175-1 is referred to as the first contact hole 1854, the contact hole exposing the second drain electrode 175-2 is referred to as the second contact hole 185-2, and the contact holes respectively exposing the connection electrodes 173-3 and 175-3 are respectively referred to as the third contact hole 185-3 and the fourth contact hole 185-4.

A plurality of pixel electrodes 190-1 and 190-2 are formed on the passivation layer 180. Exemplary embodiments thereof may be formed of a transparent conductive material such as ITO or IZO, and two pixel electrodes 190-1 are 190-2 are disposed within each pixel.

The first pixel electrode 190-1 is physically and electrically connected to the first drain electrode 175-1 through the first contact hole 1854, and receives the first data voltage from the first drain electrode 175-1. The first pixel electrode 190-1 includes a plurality of first linear electrodes 191-1 that are substantially parallel to the data lines 171 and 1714, a first stem 192-1 connecting the first linear electrodes 191-1 to each other and substantially perpendicular to the first linear electrode 1914, a first extension 193-1 extending from the first linear electrode 191-1 and the first stem 192-1 to be connected to the first drain electrode 1754, and a first short portion 194-1 connected to the short transistor STFT through the first connection electrode 173-3.

Similarly, the second pixel electrode 191-2 is physically and electrically connected to the second drain electrode 175-2 through the second contact hole 185-2, and receives the second data voltage from the second drain electrode 175-2. The second pixel electrode 190-2 includes a plurality of second linear electrodes 191-2 that are substantially parallel to the data lines 171 and 171-1, a second stem 192-2 connecting the second linear electrodes 191-2 to each other and being substantially perpendicular to the second linear electrode 191-2, a second extension 193-2 extended for the second linear electrode 191-2 and the second stem 192-2 to be connected to the second drain electrode 175-21, and a second short portion 194-2 extended to be connected to the short transistor STFT through the second connection electrode 175-3.

In the present exemplary embodiment, the first linear electrode 191-1 and the second linear electrode 191-2 are alternately formed with a predetermined distance therebetween, and are substantially parallel to each other. Such an arrangement may be referred to as an interdigitated tooth or comb-type arrangement.

As described above, the exemplary embodiment of a pixel according to the exemplary embodiment of an LCD of FIG. 5 includes pixels having different arrangements on the left and the right sides with respect to the second data line 171-2, and the second data line 171-2 is shared by both pixels.

Exemplary embodiments include configurations wherein the upper substrate (not shown) may be formed with a color filter and a black matrix, and may be formed with an opposed electrode covering substantially the entire upper substrate.

A liquid crystal layer is disposed between the upper substrate and the lower insulation substrate 110. In one exemplary embodiment, the liquid crystal layer may be aligned perpendicularly to the substrate when the voltage is not applied to the pixel electrodes 190-1 and 190-2. Molecules in the liquid crystal layer are arranged by the electric field generated between the pixel electrodes 190-1 and 190-2.

FIG. 7 is an equivalent circuit diagram of an exemplary embodiment of a pixel according to the exemplary embodiment of an LCD of FIG. 5 and FIG. 6.

Here, Gn(a), Gn−1(b), Gn+1(a), and Gn(b) indicate the gate lines, where Gn(a) and Gn+1(a) indicate the first gate lines, Gn(a) is the n-th first gate line of the first gate lines, and Gn+1(a) is the (n+1)-th first gate line. Also, Gn−1(b) and Gn(b) indicate the second gate lines, where Gn−1(b) is the (n−1)-th second gate line and Gn(b) is the n-th second gate line. Dm, Dm+1, and Dm+2 indicate the data lines, where Dm is the m-th data line, Dm+1 is the (m+1)-th data line, and Dm+2 is the (m+2)-th data line. TFT1 indicates the first thin film transistor, TFT2 indicates the second thin film transistor, and STFT indicates the short transistor.

Also, Clc indicates a liquid crystal capacitor including the pixel electrodes 190-1 and 190-2 as terminals thereof and the liquid crystal layer controlled by the electric field generated therebetween, and Cst1 and Cst2 respectively indicate a first storage capacitor and a second storage capacitor. In FIG. 5 and FIG. 6, the Vcom line is not shown, however the Vcom wiring may be included as shown in FIG. 7, and the Vcom wiring is applied with a predetermined voltage such as a Vcom voltage, it is substantially parallel to the gate lines Gn and Gn−1, and it overlaps a portion of the pixel electrodes 190-1 and 190-2. The first storage capacitor Cst1 is formed by overlapping, e.g., vertically aligning, the first pixel electrode 190-1 and the Vcom wiring with each other, and the second storage capacitor Cst2 is formed by overlapping, e.g., vertically aligning, the second pixel electrode 190-2 and the Vcom wiring with each other.

The above-described exemplary embodiment of a pixel of FIG. 5 to FIG. 7 is driven as follows.

Firstly, the gate lines Gn(a), Gn−1(b), Gn+1(a), and Gn(b) are sequentially applied with the gate-on signal regardless of the first gate line and the second gate line. That is, the gate-on signal is applied with the sequence of Gn−1(b), Gn(a), Gn(b), and Gn+1(a) of FIG. 7. Also, after all gate lines are sequentially applied with the gate-on signal, 1 frame is passed. The data lines Dm and Dm+1, and Dm+1 and Dm+2 are applied with the data voltages having the different polarities from one another, and according to the present exemplary embodiment, the two voltages applied to the data lines may have substantially the same magnitude. The polarity of the data voltage may be changed for each predetermined period.

The operation of the left pixel of FIG. 7 will be described in more detail as follows. The data voltage applied through the data line Dm is passed through the first thin film transistor TFT1 and is transmitted to a position A when the first thin film transistor TFT1 is turned on in response to a gate-on signal being applied to the gate line Gn(a). Also, the data voltage applied to the data line Dm+1 is passed through the second thin film transistor TFT2 and is transmitted to a position B when the second thin film transistor TFT2 is turned on in response to a gate-on signal being applied to the gate line Gn(a). The data voltages applied to the positions A and B form the voltages of both terminals of the liquid crystal capacitor Clc thereby generating the electric field, and as a result the liquid crystal layer is aligned thereby changing the transmittance of light therethrough. The data voltages applied to the positions A and B are respectively maintained during one frame by the first storage capacitor Cst1 and the second storage capacitor Cst2.

When the gate line Gn−1(b) is applied with the gate-on signal at the next frame, the short transistor STFT is turned on such that the voltages of both terminals of the liquid crystal capacitor Clc are shorted to each other, and as a result, the voltage levels of the positions A and B become the same. As a result, both terminals of the liquid crystal capacitor Clc (i.e., the first pixel electrode 190-1 and the second pixel electrode 190-2) do not accumulate unwanted charges.

The shorting interval S is continued during the interval in which the previous gate line Gn−1(b) is applied with the gate-on voltage, e.g., the time that the gate-on voltage is applied is several µs, and it is possible for the charges to be moved during this time, however it is difficult for the liquid crystal layer to be rearranged in such a short period of time. As a result, the arrangement of the liquid crystal layer is not changed during the shorting interval S such that the change of the luminance is not generated and the change of the transmittance does not occur.

In the exemplary embodiment of an LCD of FIG. 5 and FIG. 6, the connection electrodes 173-3 and 175-3 are additionally formed to form the short transistor STFT. However, alternative exemplary embodiments include configurations wherein the short transistor STFT may be formed without the connection electrodes 173-3 and 175-3. For example, in the exemplary embodiment of FIG. 5 and FIG. 6, the gate line is formed under the data line, however alternative exemplary embodiments include configurations wherein the data line may be disposed below the gate line, and thereby the additional connection electrode may be not necessary.

Figure 8:
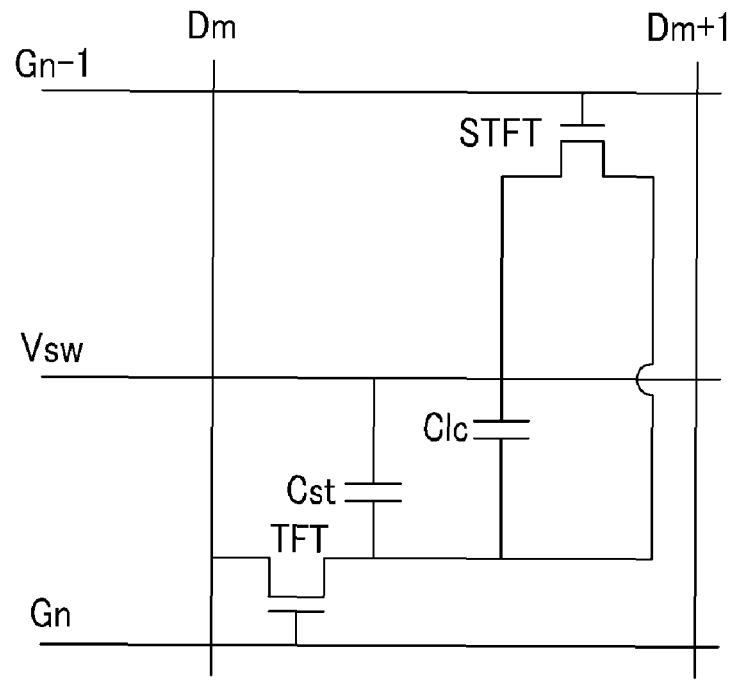
FIG. 8 is an equivalent circuit diagram of one pixel in another exemplary embodiment of an LCD according to the present invention.

FIG. 8 shows an exemplary embodiment of one pixel in another exemplary embodiment of an LCD according to the present invention, FIG. 8 is an equivalent circuit diagram of an exemplary embodiment of one pixel in another exemplary embodiment of an LCD according to the present invention.

In the exemplary embodiment of an LCD of FIG. 1 to FIG. 4 and the exemplary embodiment of an LCD of FIG. 5 to FIG. 7, the first pixel electrode and the second pixel electrode receive the data voltages through different data lines. In FIG. 8, one electrode (the first pixel electrode) of the liquid crystal capacitor Clc is applied with the data voltage through the data line, however the other electrode is connected to a swing signal line Vsw which swings between two voltage levels over a period of one frame.

The current exemplary embodiment of a pixel according to the present invention will be described with reference FIG. 8.

In the present exemplary embodiment, one pixel includes one gate line, one data line, one swing signal line Vsw, and two transistors. Also, the pixel includes the liquid crystal capacitor Clc and the storage capacitor Cst, and the liquid crystal capacitor Clc includes the first pixel electrode and the second pixel electrode as two electrodes thereof.

Here, Gn and Gn−1 indicate gate lines, where Gn indicates the n-th gate line and Gn−1 indicates the (n−1)-th gate line. Dm and Dm+1 indicate data lines, where Dm is the m-th data line and Dm+1 is the (m+1)-th data line.

The swing signal line Vsw is applied with the voltage Vsw that swings between two voltage levels (for example 0V and a voltage Avdd) with the period of one frame, it is substantially parallel to the gate lines Gn and Gn−1, and it may overlap the first pixel electrode.

The thin film transistor TFT connected to the gate line and the data line has an output terminal connected to the first pixel electrode (not shown, refer to FIG. 1 or FIG. 5). The first pixel electrode forms one electrode of the liquid crystal capacitor Clc, and the other electrode of the liquid crystal capacitor is made of the second pixel electrode (not shown, refer to FIG. 1 or FIG. 5). The second pixel electrode is electrically connected to the swing signal line Vsw.

The short transistor STFT has a control electrode connected to the previous gate line Gn−1, and an input electrode and an output electrode connected to the first pixel electrode and the second pixel electrode.

Also, the first pixel electrode overlaps the swing signal line Vsw, e.g., it is vertically aligned with the swing signal line Vsw, and thereby forms the storage capacitor Cst.

The above-described pixel of FIG. 8 is driven as follows. Firstly, the gate lines Gn and Gn−1 are sequentially applied with the gate-on signal. Also, after all gate lines are applied with the gate-on signal, 1 frame is passed. The data lines Dm and Dm+1 are applied with the data voltage, and the polarity of the data voltage, which is applied with the predetermined period, may be changed.

The data voltage applied through the data line Dm is passed through the first thin film transistor TFT and is applied to the first pixel electrode when the thin film transistor TFT is turned on. The second pixel electrode corresponding to the first pixel electrode is connected to the swing signal line Vsw, thereby receiving the voltage from the swing signal line Vsw. The voltages are applied to the first pixel electrode and the second pixel electrode, i.e., the voltages of both terminals of the liquid crystal capacitor Clc, generate the electric field, and as a result the liquid crystal layer is aligned thereby changing the transmittance of the light therethrough. The data voltage applied to the first pixel electrode is maintained during one frame by the storage capacitor Cst.

When the gate line Gn−1 is applied with the gate-on signal at the next frame, the short transistor STFT is turned on such that the voltages of both terminals of the liquid crystal capacitor Clc are shorted to one another, and as a result the voltage levels of the first pixel electrode and the second pixel electrode are equal to each other during this period (a shorting interval). As a result, both terminals of the liquid crystal capacitor Clc do not accumulate the unwanted charges.

On the other hand, the shorting interval is continued during the interval in which the gate line Gn−1 is applied with the gate-on voltage, in one exemplary embodiment, the time that the gate-on voltage is applied is several μs, and it is possible for the charges to be moved during this time, however it is difficult for the liquid crystal layer to be rearranged. As a result, the arrangement of the liquid crystal layer is not changed during the shorting interval such that the change of luminance is not generated and the change of transmittance does not occur.

Figure 9:
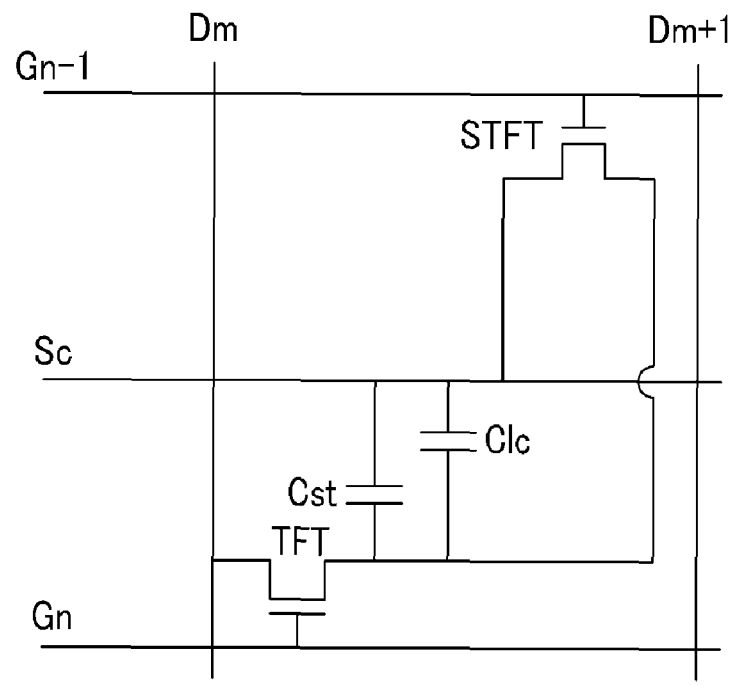
FIG. 9 is an equivalent circuit diagram of one pixel in another exemplary embodiment of an LCD according to the present invention.

FIG. 9 shows another exemplary embodiment of a pixel of another exemplary embodiment of an LCD that is different from the exemplary embodiment of FIG. 8.

FIG. 9 is an equivalent circuit diagram of an exemplary embodiment of one pixel in an exemplary embodiment of an LCD according to the present invention. Like FIG. 8, in the current exemplary embodiment of FIG. 9, one electrode (the first pixel electrode) of the liquid crystal capacitor Clc is applied with the data voltage through the data line, however the other electrode (the second pixel electrode) is not applied with the data voltage through the data line. In the exemplary embodiment of FIG. 9, the second pixel electrode is connected to the voltage signal line Sc that is applied with a constant voltage, such as a common voltage Vcom, differently from the exemplary embodiment of FIG. 8.

The current exemplary embodiment of a pixel according to the present invention will be described with reference to FIG. 9.

One pixel includes one gate line, one data line, one voltage signal line Sc, and two transistors. Also, the pixel includes the liquid crystal capacitor Clc and the storage capacitor Cst, and the liquid crystal capacitor Clc includes the first pixel electrode and the second pixel electrode as two electrodes thereof.

Here, Gn and Gn−1 indicate the gate lines, where Gn indicates the n-th gate line and Gn−1 indicates the (n−1)-th gate line. Dm and Dm+1 indicate the data lines, where Dm is the m-th data line and Dm+1 is the (m+1)-th data line. The voltage signal line Sc may be uniformly applied with the constant voltage, such as the common voltage Vcom and is disposed substantially parallel to the gate lines Gn and Gn−1, and may overlap the first pixel electrode.

The thin film transistor TFT connected to the gate line and the data line has the output terminal connected to the first pixel electrode (not shown, refer to FIG. 1 or FIG. 5). The first pixel electrode forms one electrode of the liquid crystal capacitor Clc, and the other electrode is made of the second pixel electrode (not shown, refer to FIG. 1 or FIG. 5). The second pixel electrode is electrically connected to the voltage signal line Sc.

The short transistor STFT has a control electrode connected to the previous gate line Gn−1, and an input electrode and an output electrode connected to the first pixel electrode and the second pixel electrode.

Also, the first pixel electrode overlaps the voltage signal line Sc thereby forming the storage capacitor Cst.

The above-described exemplary embodiment of a pixel of FIG. 9 is driven as follows.

Firstly, the gate lines Gn and Gn−1 are sequentially applied with the gate-on signal. Also, after all gate lines are applied with the gate-on signal, 1 frame is passed. On the other hand, the data lines Dm and Dm+1 are applied with the data voltage, and the polarity of the data voltage applied with the predetermined period may be changed.

The data voltage applied through the data line Dm is passed through the first thin film transistor TFT and is applied to the first pixel electrode when the thin film transistor TFT is turned on. The second pixel electrode corresponding to the first pixel electrode is connected to the voltage signal line Sc thereby receiving the voltage from the voltage signal line Sc. The voltages applied to the first pixel electrode and the second pixel electrode, i.e., the voltages of both terminals of the liquid crystal capacitor Clc, generate the electric field, and as a result the liquid crystal layer is aligned thereby changing the transmittance of the light therethrough. The data voltage applied to the first pixel electrode is maintained during one frame by the storage capacitor Cst.

When the gate line Gn−1 is applied with the gate-on signal at the next frame, the short transistor STFT is turned on such that the voltages of both terminals of the liquid crystal capacitor Clc are shorted to one another, and as a result the voltage levels of the first pixel electrode and the second pixel electrode are equal to each other (a shorting interval). As a result, both terminals of the liquid crystal capacitor Clc do not accumulate the unwanted charges.

The shorting interval is continued during the interval in which the gate line Gn−1 is applied with the gate-on voltage, the time that the gate-on voltage is applied is several µs, and it is possible for the charges to be moved during this time, however it is difficult for the liquid crystal layer to be rearranged in such a short time period. As a result, the arrangement of the liquid crystal layer is not changed during the shorting interval such that the change of the luminance is not generated and the change of the transmittance does not occur.

The above-described exemplary embodiments are classified into the exemplary embodiment of FIG. 1 to FIG. 4, the exemplary embodiment of FIG. 5 to FIG. 7, the exemplary embodiment of FIG. 8, and the exemplary embodiment of FIG. 9, and both electrodes (the first pixel electrode and the second pixel electrode) of the liquid crystal capacitor Clc are shorted to each other according to the signal of the previous gate line.

Next, an exemplary embodiment in which one electrode (the first pixel electrode) of the liquid crystal capacitor Clc is shorted to the voltage signal line Sc applied with the constant voltage with the predetermined period will be described.

Firstly, one exemplary embodiment of the present invention will be described with reference to FIG. 10 and FIG. 11.

Figure 10:
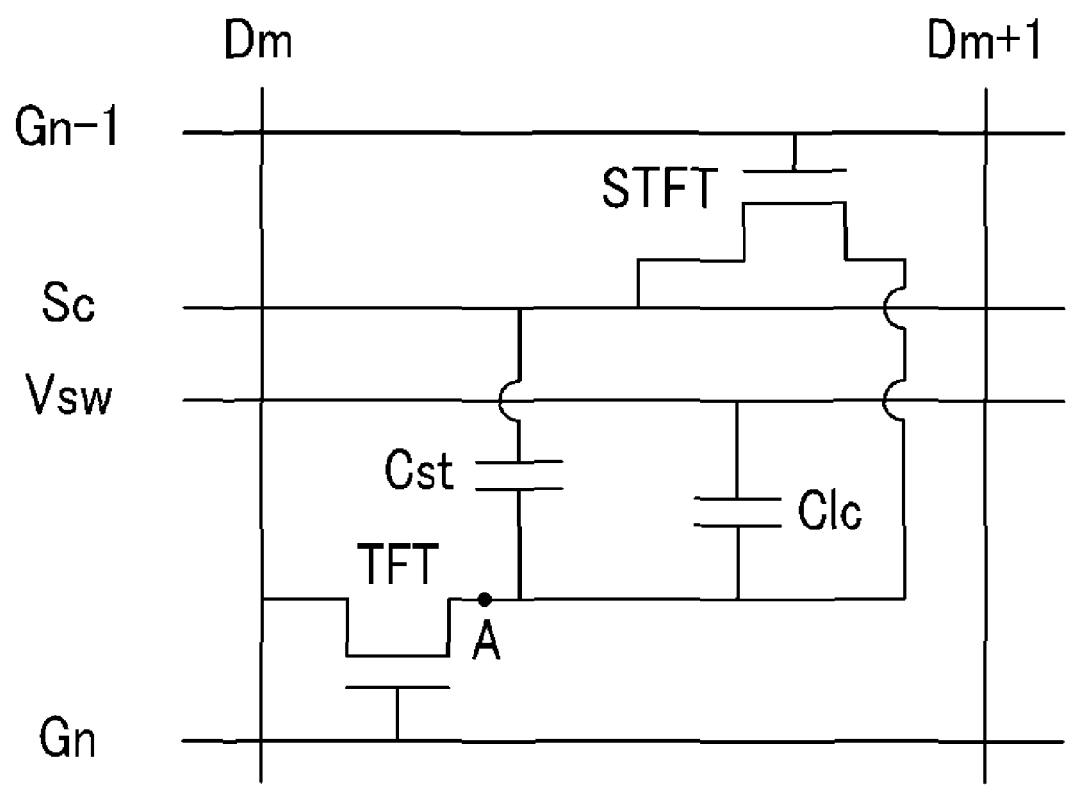
FIG. 10 is an equivalent circuit diagram of one pixel in another exemplary embodiment of an LCD according to the present invention.
Figure 11:
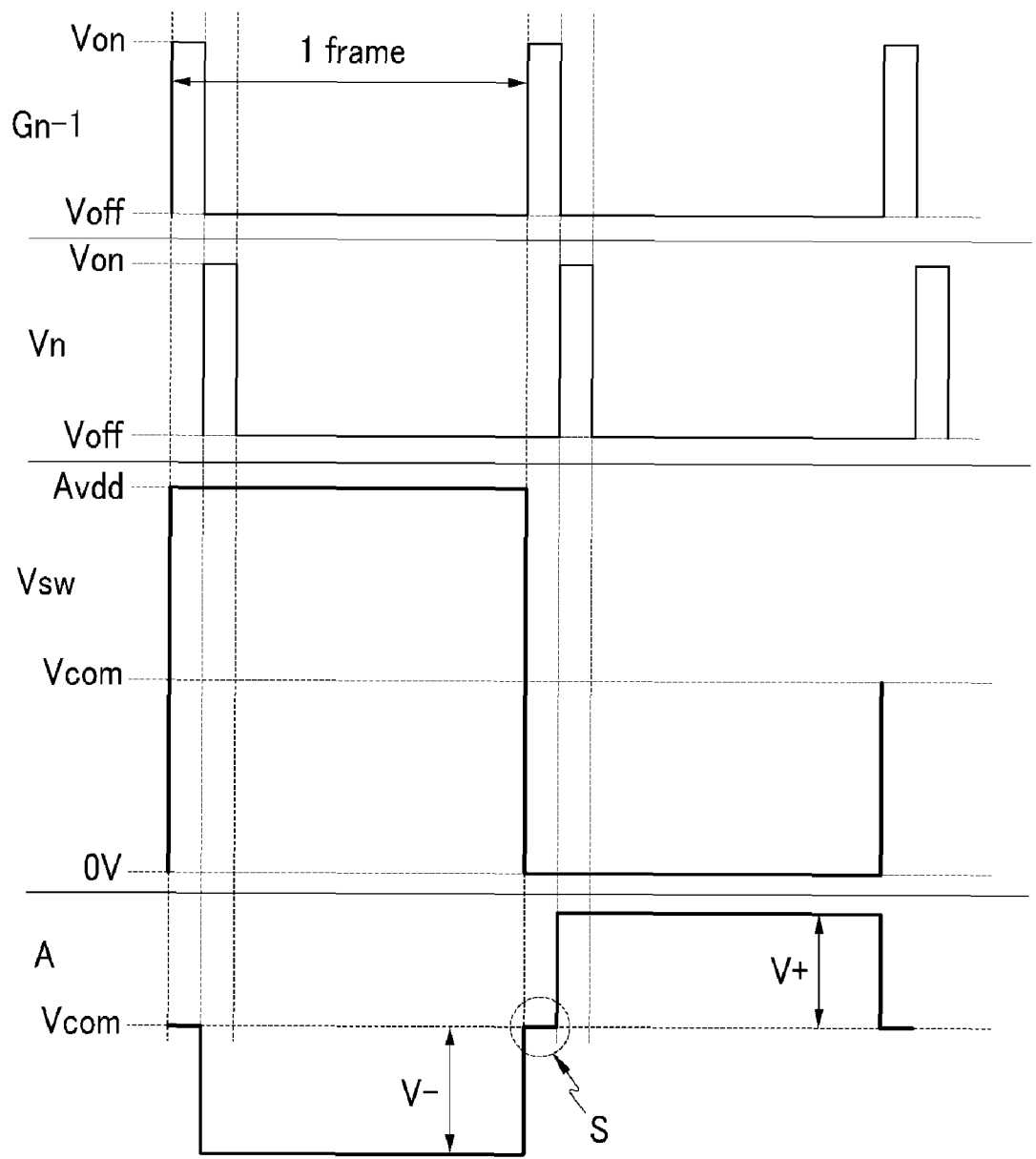
FIG. 11 is a graph showing a voltage according to a signal application in the exemplary embodiment of an LCD of FIG. 10.

FIG. 10 is an equivalent circuit diagram of an exemplary embodiment of one pixel in an exemplary embodiment of an LCD according to the present invention, and FIG. 11 is a graph showing a voltage according to a signal application in the exemplary embodiment of FIG. 10.

The current exemplary embodiment of a pixel according to the present invention will be described with reference to FIG. 10.

One pixel includes one gate line, one data line, one voltage signal line Sc, one swing signal line Vsw, and two transistors TFT and STFT. Also, the pixel includes the liquid crystal capacitor Clc and the storage capacitor Cst, and the liquid crystal capacitor Clc includes the first pixel electrode and the second pixel electrode as two electrodes thereof.

In FIG. 10, Gn and Gn−1 indicate the gate lines, where Gn is the n-th gate line and Gn−1 is the (n−1)-th gate line. Dm and Dm+1 indicate the data lines, where Dm is the m-th data line and Dm+1 is the (m+1)-th data line.

The voltage signal line Sc is a signal line that is substantially uniformly applied with the constant voltage, such as the common voltage Vcom, it is substantially parallel to the gate lines Gn and Gn−1, and it may overlap a portion of the first pixel electrode, e.g., it may be vertically aligned with a portion of the first pixel electrode.

The swing signal line Vsw is applied with the voltage Vsw that swings between two voltage levels (for example 0V and a voltage Avdd) with the period of one frame, is substantially parallel to the gate lines Gn and Gn−1, and is electrically connected to the second pixel electrode.

The thin film transistor TFT connected to the gate line and the data line has an output terminal connected to the first pixel electrode (not shown, refer to FIG. 1 or FIG. 5). The first pixel electrode forms one electrode of the liquid crystal capacitor Clc, and the other electrode is made of the second pixel electrode (not shown, refer to FIG. 1 or FIG. 5). The second pixel electrode is electrically connected to the swing signal line Vsw.

The short transistor STFT has a control electrode connected to the previous gate line Gn−1, and an input electrode and an output electrode connected to the first pixel electrode and the voltage signal line Sc, respectively.

Also, the first pixel electrode overlaps the voltage signal line Sc, thereby forming the storage capacitor Cst. Although not shown in FIG. 10, the voltage signal line Sc and the second pixel electrode may overlap with each other, e.g., they may be vertically aligned, thereby forming another storage capacitor.

The above described pixel is driven as shown in FIG. 11.

Firstly, the gate lines Gn and Gn−1 are sequentially applied with the gate-on signal. Also, after all gate lines are applied with the gate-on signal, 1 frame is passed. On the other hand, the data lines Dm and Dm+1 are applied with the data voltage, and the polarity of the data voltage applied with the predetermined period may be changed.

The data voltage applied through the data line Dm is passed through the thin film transistor TFT and is applied to the first pixel electrode when the thin film transistor TFT is turned on. The second pixel electrode corresponding to the first pixel electrode is connected to the swing signal line Vsw, thereby receiving the voltage from the swing signal line Vsw. The voltages applied to the first pixel electrode and the second pixel electrode, i.e., the voltages of both terminals of the liquid crystal capacitor Clc, generate the electric field, and as a result the liquid crystal layer is aligned thereby changing the transmittance of the light therethrough. On the other hand, the data voltage applied to the first pixel electrode is maintained during one frame by the storage capacitor Cst.

If the gate line Gn−1 is applied with the gate-on signal at the next frame, the short transistor STFT is turned on such that the voltage of the terminal of the liquid crystal capacitor Clc corresponding to the first pixel electrode is shorted to the constant voltage, such as the common voltage Vcom, and as a result the first pixel electrode and the voltage signal line Sc are shorted such that the voltage levels of the first pixel electrode and the constant voltage, such as the common voltage Vcom are equal to each other during a shorting interval S. Therefore, the first pixel electrode does not accumulate the unwanted charges. Also, although the voltage applied to the first pixel electrode is temporarily changed under the inversion driving, the magnitude of the changed voltage is reduced by the shorting interval S. That is, the voltage applied to the first pixel electrode is temporarily changed from the negative data voltage (V−) to the positive data voltage (V+) under the inversion driving, however the magnitude of the changed voltage is large such that time for arriving at the positive data voltage (V+) is generally necessary. The opposite case thereof is the same, however, like the present embodiment of FIG. 11, the voltage of the position A arrives at the constant voltage, such as the common voltage Vcom in the shorting interval S in which the short transistor STFT is turned on, and is then changed to the desired data voltage such that the time for arriving at the desired voltage is reduced.

The shorting interval is continued during the interval in which the gate line Gn−1 is applied with the gate-on voltage, the time that the gate-on voltage is applied is several µs, and it is possible for the charges to be moved during this time, however it is difficult for the liquid crystal layer to be rearranged during such a short interval. As a result, the arrangement of the liquid crystal layer is not changed during the shorting interval such that the change of the luminance is not generated and the change of the transmittance does not occur.

FIG. 10 shows an exemplary embodiment of a pixel of an LCD having the structure in which the first pixel electrode and the voltage signal line Sc are shorted, and one pixel includes two thin film transistors TFT and STFT. Next, the structure of an exemplary embodiment of one pixel including three thin film transistors TFT1, TFT2, and STFT will be described with reference to FIG. 12. Also, differently from FIG. 11, FIG. 12 shows the second thin film transistor TFT2 connected to the second pixel electrode, and the second storage capacitor connected between the second pixel electrode and the voltage signal line Sc.

Figure 12:
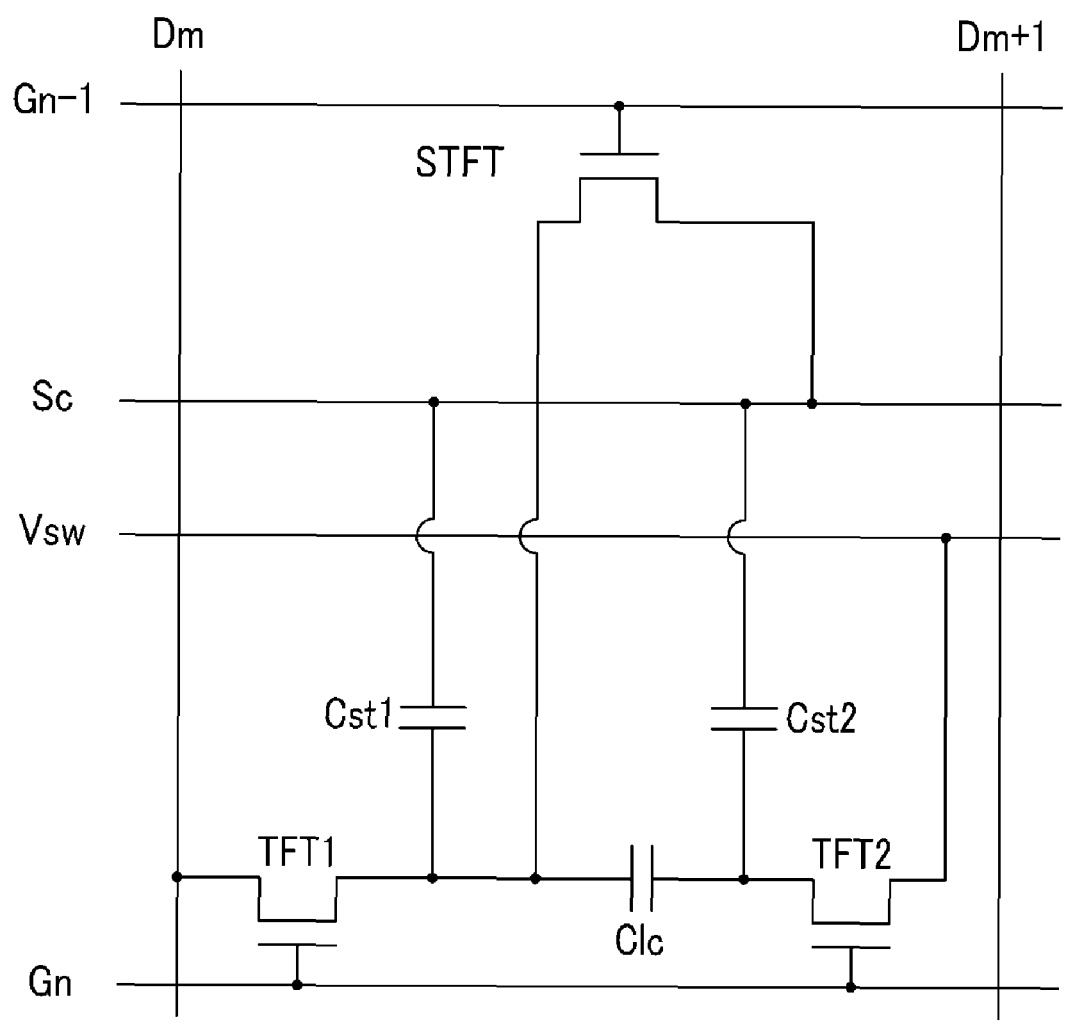
FIG. 12 is an equivalent circuit diagram of one pixel in another exemplary embodiment of an LCD according to the present invention.

In the exemplary embodiment of an LCD of FIG. 12, one pixel include one gate line, one data line, one voltage signal line Sc, one swing signal line Vsw, and three transistors TFT1, TFT2, and STFT. Also, the pixel includes the liquid crystal capacitor Clc and the storage capacitor Cst, and the liquid crystal capacitor Clc includes the first pixel electrode and the second pixel electrode as two electrodes thereof.

In FIG. 12, Gn and Gn−1 indicate the gate lines, where Gn is the n-th gate line and Gn−1 is the (n−1)-th gate line. Dm and Dm+1 indicate the data lines, where Dm is the m-th data line and Dm+1 is the (m+1)-th data line.

The voltage signal line Sc is substantially uniformly applied with the constant voltage, such as the common voltage Vcom and is substantially parallel to the gate lines Gn and Gn−1, and may overlap, e.g., be vertically aligned with, the first and second pixel electrodes.

The swing signal line Vsw is applied with the voltage Vsw that swings between two voltage levels (for example 0V and a voltage Avdd) with the period of one frame, and is substantially parallel to the gate lines Gn and Gn−1.

The first thin film transistor TFT1 is connected to the gate line and the data line and includes an output terminal connected to the first pixel electrode (not shown, refer to FIG. 1 or FIG. 5). The second thin film transistor TFT2 is connected to the same gate line as the first thin film transistor TFT1, and has an input terminal connected to the swing signal line Vsw, and an output terminal connected to the second pixel electrode (not shown, refer to FIG. 1 or FIG. 5). The first pixel electrode and the second pixel electrode form two electrodes of the liquid crystal capacitor Clc.

The short transistor STFT has a control electrode connected to the previous gate line Gn−1, and an input electrode and an output electrode connected to the first pixel electrode and the voltage signal line Sc.

Also, the first pixel electrode overlaps the voltage signal line Sc thereby forming the storage capacitor Cst, and the second pixel electrode overlaps the voltage signal line Sc thereby forming the second storage capacitor Cst2.

The above described pixel is driven as follows. Firstly, the gate lines Gn and Gn−1 are sequentially applied with the gate-on signal. Also, after all gate lines are applied with the gate-on signal, 1 frame is passed. The data lines Dm and Dm+1 are applied with the data voltage, and the polarity of the data voltage applied with the predetermined period may be changed.

The data voltage applied through the data line Dm is passed through the first thin film transistor TFT1 and is applied to the first pixel electrode when the first thin film transistor TFT1 is turned on. The second pixel electrode is applied with the voltage Vsw from the swing signal line Vsw through the second thin film transistor TFT2 that is turned on along with the first thin film transistor TFT1. The voltages applied to the first pixel electrode and the second pixel electrode, i.e., the voltages of both terminals of the liquid crystal capacitor Clc, generate the electric field, and as a result the liquid crystal layer is aligned thereby changing the transmittance of the light therethrough. The voltages applied to the first pixel electrode and the second pixel electrode are maintained during one frame by the storage capacitors Cst1 and Cst2.

When the gate line Gn−1 is applied with the gate-on signal at the next frame, the short transistor STFT is turned on such that the voltages of both terminals of the liquid crystal capacitor Clc are shorted, as a result the first pixel electrode and the voltage signal line Sc are shorted such that the first pixel electrode has the same level as that of the constant voltage, such as the common voltage Vcom (a shorting interval S). Therefore, the first pixel electrode does not accumulate the unwanted charges. Also, although the voltage applied to the first pixel electrode is temporarily changed under the inversion driving, the magnitude of the changed voltage is reduced by the shorting interval S. That is, the voltage applied to the first pixel electrode is temporarily changed from the negative data voltage (V−) to the positive data voltage (V+) under the inversion driving, however the magnitude of the changed voltage is large such that time for arriving at the positive data voltage (V+) is generally necessary. The opposite case thereof is the same, however, like the present invention, the voltage of the first pixel electrode arrives at the constant voltage, such as the common voltage Vcom in the shorting interval S in which the short transistor STFT is turned on, and then is changed to the desired data voltage such that the time for arriving at the desired voltage is reduced.

The shorting interval is continued during the interval in which the gate line Gn−1 is applied with the gate-on voltage, the time that the gate-on voltage is applied is several μs, and it is possible for the charges to be moved during this time, however it is difficult for the liquid crystal layer to be rearranged during the short time interval. As a result, the arrangement of the liquid crystal layer is not changed during the shorting interval such that the change of the luminance is not generated and the change of the transmittance does not occur.

In the exemplary embodiment of an LCD of FIG. 10 and FIG. 12, the voltage signal line Sc and the swing signal line Vsw may be a single signal line. Here, one signal line may be applied with the voltage of the substantially uniform level such as the common voltage Vcom, or the voltage that swings between two levels such as the swing signal line Vsw.

The exemplary embodiments of FIG. 1 to FIG. 12 may include an opposed electrode formed on the surface of the upper substrate, and the opposed electrode may be floated, or it may be applied with the constant voltage, such as the common voltage Vcom, or the same voltage as one voltage applied to one of the two pixel electrodes may be applied thereto.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a gate line disposed on the first substrate;
   a first data line disposed substantially perpendicularly to the gate line on the first substrate, and which insulates the gate line;
   a first thin film transistor connected to the gate line and the first data line;
   a first pixel electrode connected to the first thin film transistor;
   a liquid crystal capacitor including the first pixel electrode and a second pixel electrode as two terminals thereof, and a liquid crystal layer disposed between the first pixel electrode and the second pixel electrode; and
   a short transistor having a control terminal connected to a previous gate line, and which is controlled to short the first pixel electrode to a voltage approaching a voltage of the second pixel electrode.

2. The liquid crystal display of claim 1, wherein an input terminal and an output terminal of the short transistor are respectively connected to the first pixel electrode and the second pixel electrode.

3. The liquid crystal display of claim 2, further comprising:
a second data line disposed substantially parallel to the first data line; and
a second thin film transistor including a control terminal connected to the gate line, an input terminal connected to the second data line, and an output terminal connected to the second pixel electrode.

4. The liquid crystal display of claim 3, wherein the first pixel electrode includes a plurality of first linear electrodes disposed substantially parallel to the data line, a first stem which connects the linear electrodes, a first extension which connects the first linear electrodes and the first stem to the first thin film transistor, and a first short portion which connects the first linear electrode and the first stem to the short transistor, and
the second pixel electrode includes a plurality of second linear electrodes disposed substantially parallel to the data line, a second stem which connects the linear electrodes, a second extension which connects the second linear electrode and the second stem to the second thin film transistor, and a second short portion which connects the second linear electrode and the second stem to the short transistor.

5. The liquid crystal display of claim 4, wherein the liquid crystal display further comprises:
a first pixel including the first thin film transistor and the second thin film transistor; and
a second pixel disposed adjacent to the first pixel and comprising:
a third thin film transistor disposed substantially opposite to the first thin film transistor with respect to the second thin film transistor, and connected to the second data line;
a fourth thin film transistor disposed adjacent to the third thin film transistor; and
a second short transistor which is controlled to short the third pixel electrode.

6. The liquid crystal display of claim 5, wherein a timing with which the first thin film transistor and the second thin film transistor of the first pixel are turned on is different from a timing with which the third thin film transistor and the fourth thin film transistor of the second pixel are turned on, and
the first thin film transistor and the second thin film transistor of the first pixel are turned on when the second short transistor of the second pixel is turned on, and the third thin film transistor and the fourth thin film transistor of the second pixel are turned on when the short transistor of the first pixel is turned on.

7. The liquid crystal display of claim 2, further comprising:
a swing signal line which swings between two voltage levels with a period of one frame, and
wherein the second pixel electrode is connected to the swing signal line.

8. The liquid crystal display of claim 7, wherein the two voltage levels are about 0V and a voltage level of an Avdd voltage.

9. The liquid crystal display of claim 2, further comprising:
a voltage signal line applied with a constant voltage,
wherein the second pixel electrode is connected to the voltage signal line.

10. The liquid crystal display of claim 1, wherein an input terminal and an output terminal of the short transistor are connected to the first pixel electrode and a voltage signal line which is applied with a constant voltage.

11. The liquid crystal display of claim 10, further comprising:
a storage capacitor which includes the first pixel electrode and the voltage signal line as two terminals thereof.

12. The liquid crystal display of claim 10, further comprising:
a swing signal line which swings between two voltage levels with a period of one frame,
wherein the second pixel electrode is connected to the swing signal line.

13. The liquid crystal display of claim 12, further comprising:
a second thin film transistor including a control terminal connected to the gate line, and an input terminal and output terminal respectively connected to the swing signal line and the second pixel electrode.

* * * * *